(12) United States Patent
Kobayashi et al.

(10) Patent No.: US 6,433,509 B2
(45) Date of Patent: Aug. 13, 2002

(54) POWER SUPPLY UNIT

(75) Inventors: Takaki Kobayashi; Shinya Kimoto; Ko Watanabe, all of Aichi (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/906,278

(22) Filed: Jul. 16, 2001

(30) Foreign Application Priority Data

Jul. 17, 2000 (JP) ........................................ 2000-215974

(51) Int. Cl.⁷ .............................................. H01M 10/46
(52) U.S. Cl. ........................................ 320/107; 320/150
(58) Field of Search ................................ 320/107, 110, 320/150, 153

(56) References Cited

U.S. PATENT DOCUMENTS

| 5,871,859 A | * | 2/1999 | Parise |
| 5,879,833 A | | 3/1999 | Yoshii et al. |
| 6,057,050 A | * | 5/2000 | Parise |
| 6,225,788 B1 | * | 5/2001 | Kouzu et al. |

FOREIGN PATENT DOCUMENTS

| JP | 10-3950 | 1/1998 |
| JP | 10-252466 | 8/1998 |
| JP | 11-111349 | 4/1999 |

* cited by examiner

*Primary Examiner*—Edward H. Tso
(74) *Attorney, Agent, or Firm*—Merchant & Gould PC

(57) ABSTRACT

A power supply unit capable of simplifying the structure of a battery case and improving the cooling efficiency by increasing the cross sectional area of a coolant passage. A power supply unit includes a battery case; a plurality of battery modules disposed in parallel, each battery module is composed of three cells connected in series in a row, and the front end and the rear end of the battery module are held by the front part and the rear part of the battery case; a cooling fan for forcing a cooling air to flow in the passage between the neighboring battery modules; a shielding plate for shielding the cooling air from the battery module, which is placed at the upstream side of the passage and; a rectifying fin for increasing the flow rate of the cooling air, which is placed at the downstream side of the passage.

12 Claims, 2 Drawing Sheets

POWER SUPPLY UNIT

BACKGROUND OF THE INVENTION

1. Field of the Invention

The present invention relates to a power supply unit including a number of cells connected in series and being used for an electric vehicle such as a pure electric car, etc. In more detail, the present invention relates to a radiator of cells constituting the power supply unit.

2. Description of the Prior Art

In general, in an electric vehicle such as a pure electric car, etc., in order to supply a motor etc. with electric power for driving a vehicle, a power supply unit including a number of cells connected in series is mounted. In this way, a number of cells connected in series are used as a power supply unit of an electric vehicle, it is necessary to dispose a plurality of cells densely from the viewpoint of space efficiency, etc. Therefore, plural rows of storage batteries in which a plurality of cells arranged in a row and electrically connected in series are disposed in parallel.

When a plurality of cells are disposed densely as mentioned above, the temperature in the power supply unit is raised due to heat generation, Joule heat or the like of the cells, thus raising the temperature of each cell. Therefore, conventionally, a method for suppressing the temperature rise of each cell by allowing a coolant such as air, etc. to circulate between cells has been employed.

However, the conventional cooling method increases the difference in temperature between cells, which may lead to a variation of the battery performance, for example, charge-discharge capacity or life, etc., between cells. Therefore, the reliability as a power supply unit was low.

In order to reduce the difference in temperature between cells, JP10 (1998)-3950A proposes a power supply unit including a group of storage batteries in which plural rows of storage batteries including a plurality of cells connected in series in a row are disposed in parallel above and below and left and right of a coolant passage for allowing a coolant to circulate between the rows of the storage battery, wherein the coolant passage includes a main coolant passage that is exposed to the cells within the same storage battery row and a sub-coolant passage whose upstream side is separated from the storage battery row and whose downstream end is connected to the main coolant passage at the position corresponding to the midstream or downstream end of the storage battery row. With this configuration, the following effects can be obtained. Namely, the temperature of the coolant circulating in the main coolant passage is increased by the endothermic from the cells of the upstream of the storage battery rows and the cooling efficiency at the midstream and downstream is deteriorated. However, in the midstream and the downstream of the main coolant passage, by combining the coolant circulating in the main coolant passage with a low temperature coolant, the temperature of the coolant is lowered. Thus, the cooling efficiency of the cells at the further downstream can be enhanced to reduce the difference in temperatures within the storage battery row.

However, there is a problem in that with the configuration of the power supply unit suggested in JP10 (1998)-3950A, the structure of the case housing the storage battery row (battery module) becomes complicated. Namely, a battery holding member for holding the storage battery row (battery module) is necessary, and also an idea for forming a sub-coolant passage, or for connecting the main coolant passage with the sub-coolant passage at the position corresponding to the midstream or downstream of the storage battery row (battery module) is necessary. Furthermore, since the cross-sectional area of the passage is small, the pressure loss of the coolant is increased, thus deteriorating the cooling efficiency.

SUMMARY OF THE INVENTION

It is an object of the present invention to provide a power supply unit in which the structure of the battery case can be simplified and a cross sectional area of the passage is increased to improve the cooling efficiency.

In order to achieve the above-mentioned object, a power supply unit according to the present invention includes; a battery case, a plurality of battery modules disposed in parallel, each battery module being composed of three cells or less connected in series, and the front end and the rear end of the battery module being held by the front part and the rear part of the battery case, a cooling system for forcing a coolant to flow in a passage between the neighboring battery modules, and a shielding system placed at the upstream side of the coolant passage and shielding the coolant from the battery module. According to the configuration of this power supply unit, since each battery module is composed of three cells or less, when the front end and the rear end of the battery module are held by the front part and the rear part of the battery case, the cells positioned in the middle part are held securely by the cells positioned at both ends. Consequently, it is possible to prevent the connection parts of the battery module from being deviated or detached from each other due to the vibration from the outside. Therefore, since a battery holding member other than the holding means for the front part and the rear part of the battery case is not required, the structure of the battery case can be simplified. Furthermore, for the same reason, since a cross-sectional area of the passage between the neighboring battery modules can be increased, it is possible to reduce the pressure loss of the coolant and to improve the cooling efficiency. Furthermore, since the means for shielding the coolant from the battery module is provided at the upstream side of the coolant passage, the heat amount that the coolant entering the passage between the neighboring battery modules within the battery case can absorb from the cell placed at the upstream side is reduced. Therefore, since the temperature of the coolant is not increased due to the heat of the cell placed at the upstream side of the coolant passage, it is possible to cool the cell at the midstream and downstream efficiently. In particular, since the battery module is composed of three cells or less, as compared with the battery module composed of four cells or more, it is possible to reduce the variation in temperatures between cells. Therefore, the temperature difference between cells within the battery module can be reduced. Thus, it is possible to suppress the variation of the battery performance such as charge/discharge capacity or life, etc. As a result, the reliability as a power supply unit can be enhanced.

Furthermore, it is preferable that the configuration of the power supply unit of the present invention includes means for increasing the flow rate of the coolant, the means being placed at the downstream side of the coolant passage. With this preferable configuration, it is possible to improve the cooling efficiency of the cells positioned at the downstream side of the coolant passage. Furthermore, in this case, it is preferable that the means for increasing the flow rate of the coolant is a wedge-shaped rectifying fin protruding into the battery case.

Furthermore, in the power supply unit of the present invention, it is preferable that a detachable first constraint plate is further provided at the front part of the battery case and the front end of the battery module is held by the first constraint plate. According to this configuration, after the battery module is housed in the battery case, the battery modules can be held in the battery case. Furthermore, in this case, it is preferable that an air inlet port is provided in the first constrained plate, which is placed between the neighboring battery modules and draws the coolant into the battery case from the outside, and the means for shielding the coolant from the battery module is integrated into the first constraint plate with the air inlet port sandwiched therebetween. According to this preferable configuration, since the means for shielding the coolant from the battery module is integrated into the first constraint plate, the number of the components can be reduced.

Furthermore, it is preferable in the power supply unit of the present invention that the means for shielding the coolant from a battery module is provided approximately in parallel to the battery modules while protruding into the battery case.

Furthermore, it is preferable that the power supply unit of the present invention satisfies the relationship: $L/2 < m \leq L$, where L denotes a length of the cell, and m denotes a length of the shielding system for shielding the coolant from the battery module. According to this preferable configuration, heat exchange amount can be reduced.

Furthermore, in the power supply unit of the present invention, it is preferable that a second constraint plate is further provided at the rear part of the battery case and the rear end of the battery module is held by the second constraint plate. Furthermore, in this case, it is preferable that an exhaust port for exhausting the coolant to the outside from the inside of the battery case is provided in the second constraint plate, and a means for increasing the flow rate of the coolant is integrated into the second constraint plate. According to this preferable configuration, since the means for increasing the flow rate of the coolant is integrated into the second constraint plate, the number of the components can be reduced.

DESCRIPTION OF THE PREFERRED EMBODIMENTS

Hereinafter, the present invention will be described more specifically by way of embodiments.

Figure 1:
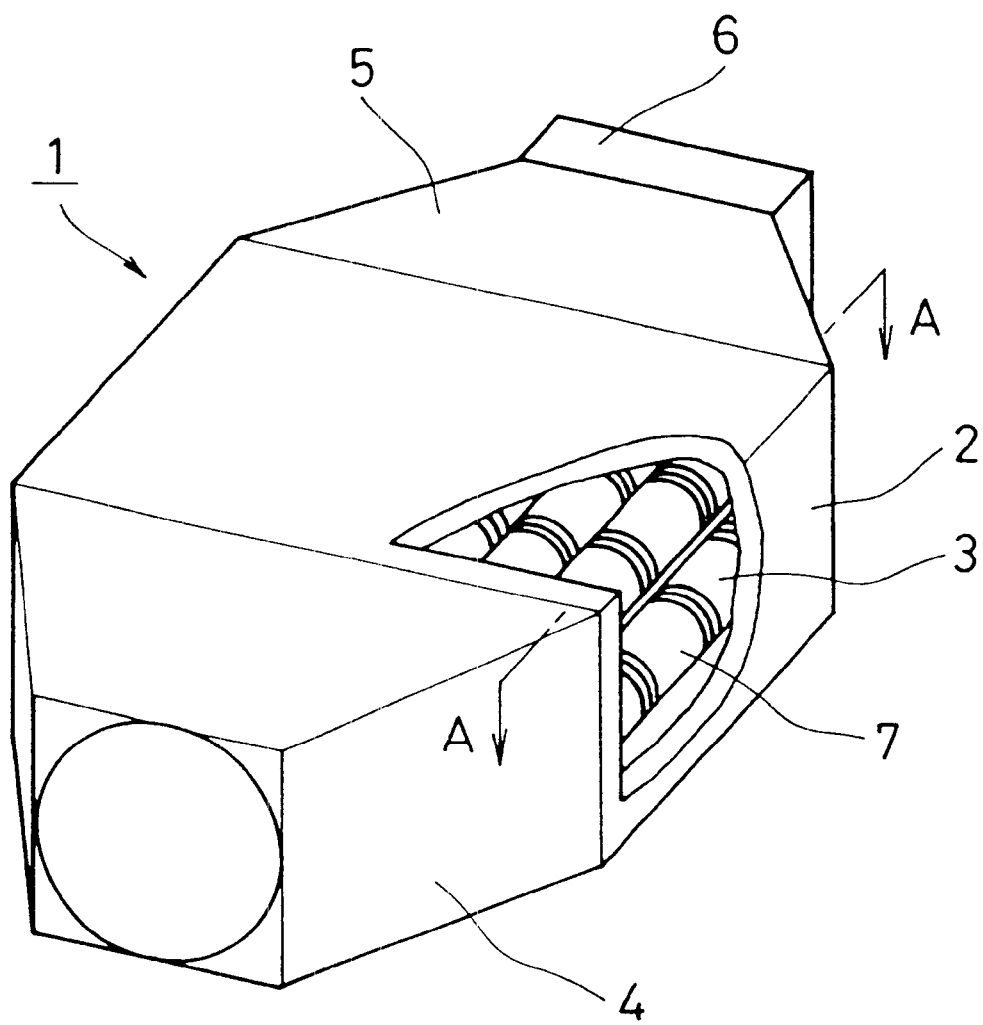
FIG. 1 is a perspective view showing a power supply unit according to an embodiment of the present invention.
Figure 2:
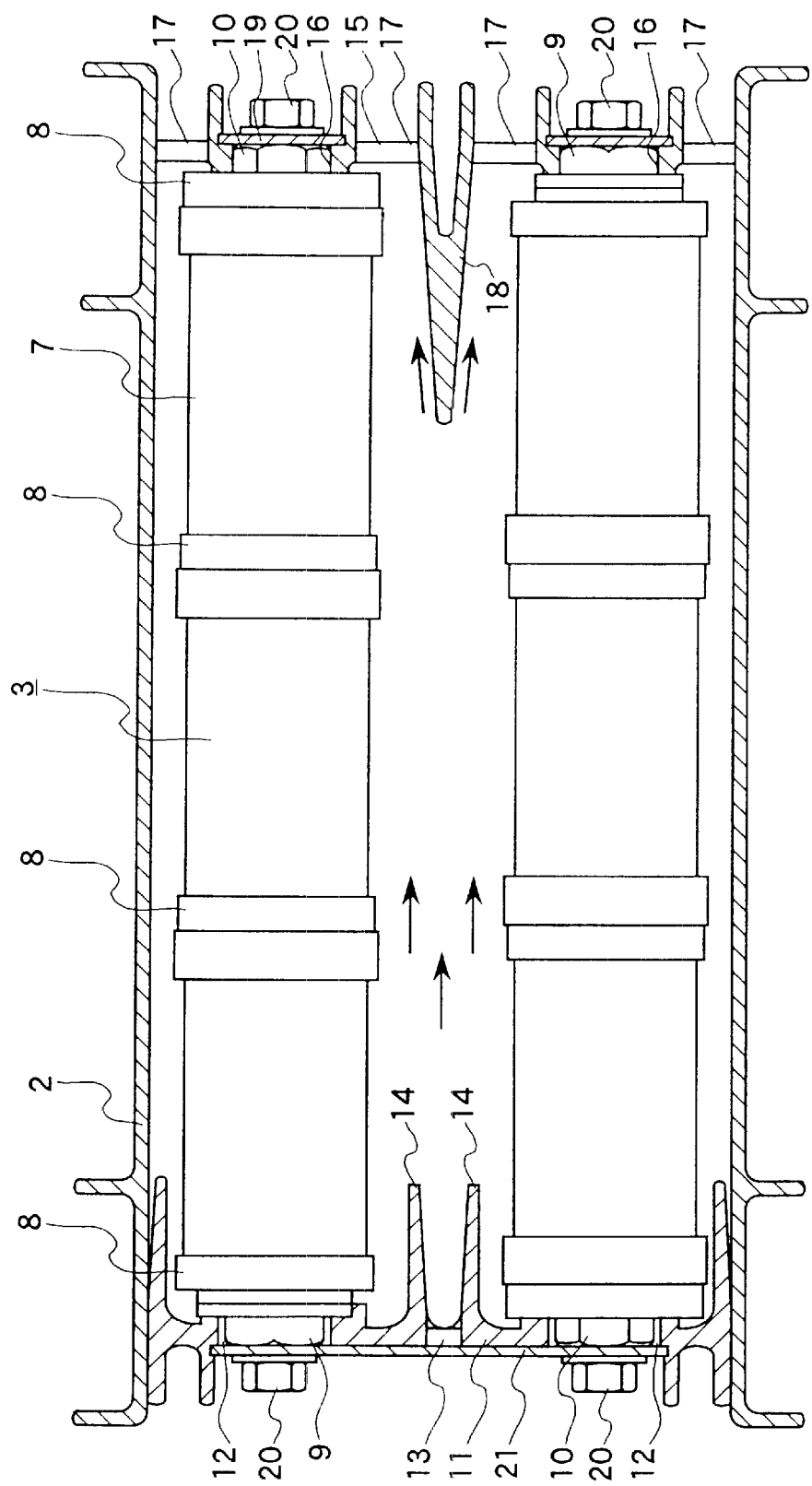
FIG. 2 is a cross sectional view taken on line A—A of FIG. 1.

FIG. 1 is a perspective view showing a power supply unit according to an embodiment of the present invention; and FIG. 2 is a cross sectional view taken on line A—A of FIG. 1.

As shown in FIGS. 1 and 2, the power supply unit 1 includes a battery case 2, a plurality of battery modules 3, an air introduction duct 4, an air exhaust duct 5, and a cooling fan 6. The battery modules 3 are housed in the battery case 2, and each battery module is composed of a plurality of cells connected in series. The air introduction duct 4 introduces air (cooling air) as a coolant into the battery case 2 from the outside, and the air exhaust duct 5 exhausts a cooling air from the inside of the battery case 2 to the outside. The cooling fan 6 is provided in the air exhaust duct 5, and forces the cooling air to circulate in the battery case 2.

The battery module 3 includes three cells 7, for example, nickel-hydride secondary cells, connected in series in a row via connection rings 8. A joint nut 9 is spot-welded to the connection ring 8 attached to a positive terminal of the battery module 3. Likewise, a joint nut 10 is spot-welded to the connection ring 8 attached to a negative terminal of the battery module 3.

The battery case 2 has an upper stage and a lower stage. Both in the upper stage and lower stage, a plurality of battery modules 3 are arranged in parallel.

In the front part of the battery case 2, a first constraint plate 11 is attached detachably. The first constraint plate 11 is provided with nut through holes 12 for allowing the nut 9 placed at the positive terminal or the nut 10 placed at the negative terminal to passage through and an air inlet port 13 placed in the middle part between the upper and lower nut through holes 12. Furthermore, at the upper edge and lower edge of the air inlet port 13, a couple of shielding plates 14, which are approximately in parallel with each other, are integrated into the first constraint plate 11 while protruding into the battery case 2. Thereby, the cooling air entering the passage between the upper and lower battery modules 3 from the air inlet port 13 is shielded by the shielding plates 14 so that the amount of heat absorbed from the first cell 7 is reduced. In this case, it is desirable that the following relationship is satisfied: $L/2 < m \leq L$ (wherein L denotes a length of the cell 7, and m denotes a length of the shielding plate 14). When the above-mentioned relationship is satisfied, it is possible to lower the heat exchange amount. Furthermore, by integrating the shielding plate 14 into the first constraint plate 11, it is also possible to reduce the number of the components. The upper and lower parts of the first constraint plate 11 are provided with step parts so that the upper and lower ends of a fixing plate 21 provided with a plurality of bolt through holes can be attached into contact therewith. Thus, the bolt 20 is welded to the nut 9 and the nut 10 via the fixing plate 21.

In the rear part of the battery case 2, the second constraint plate 15 is fixed. Similar to the first constraint plate 11, the second constraint plate 15 is provided with a nut through hole 16 for allowing the nut 9 placed at the positive terminal of the battery module 3 or the nut 10 placed at the negative terminal of the battery module 3 to passage through and a large number of exhaust ports 17. The circumference of the nut through hole 16 is provided with a step part so that the circumference of a washer 19 can be placed into contact with thereof. Thus, the bolt 20 is tightened to the nut 9 and nut 10 via the washer 19. Furthermore, in the middle part between the upper and lower nut through holes 16, a wedge-shaped rectifying fin 18 is integrated into the second constraint plate 15 while protruding into the battery case 2. Thereby, since a cross sectional area of a passage between third cells 7 is reduced, the flow rate of the cooling air entering from the air inlet port 13 is increased around the third cell 7. In this case, by integrating the rectifying fin 18 into the second constraint plate 15, it is possible to reduce the number of components.

Next, a method for assembling the power supply unit 1 having the above-mentioned structure will be described briefly.

First, the battery modules 3 are inserted into the battery case 2 from the front part of the battery case 2 with the polarities alternated, and then the nut 9 placed at the positive terminal of the battery module 3 and the nut 10 placed at the negative terminal of the battery module 3 are allowed to passage through the nut through hole 16 formed on the second constraint plate 15. Next, the first constraint plate 11 is inserted into the battery case 2 from the front part and the nut 10 placed at the negative terminal of the battery module 3 and the nut 9 placed at the positive terminal of the battery module 3 are allowed to passage through the nut through hole 12 formed on the first constraint plate 11. Next, a bolt 20 is tightened temporarily with respect to the nuts 9 and 10 passing through the nut through hole 16 of the second constraint plate 15 via the washer 19, and at the same time, the bolt 20 is tightened temporarily with respect to the nuts 10 and 9 passing through the nut through hole 12 of the first constraint plate 11 via the fixing plate 21. Next, all bolts are tightened firmly, and a plurality of battery modules 3 are housed in a state in which they are fixed in the battery case 2.

Next, the air introducing duct 4 is attached to the front part of the battery case 2, and the air exhaust duct 5 equipped with a cooling fan 6 is attached to the rear part of the battery case 2. Thus, it is possible to obtain a power supply unit 1 including a large number of cells 7 connected in series and equipped with a radiator.

As mentioned above, in this embodiment, since each battery module 3 is composed of three cells 7, when the positive terminal and negative terminal are held in the front part and rear part of the battery case 2, the cell 7 placed in the middle is secured reliably by the cells placed on both ends. As a result, it is possible to prevent the connecting part (connection ring 8) of the battery modules 3 from being deviated or detached due to vibration from the outside. Therefore, since a battery holding member other than the holding means for the front part and the rear part of the battery case 2 is not required, the structure of the battery case 2 can be simplified. Furthermore, for the same reason, since the cross sectional area of the passage between the upper battery module and the lower parts of the battery module can be increased, it is possible to improve the cooling efficiency by reducing the pressure loss of the coolant.

Next, a method for radiating heat from the cell 7 in the power supply unit 1 having the above-mentioned structure will be described.

When a cooling fan 6 operates, air (cooling air) is introduced into the battery case 2 from the outside through the air introducing duct 4 attached to the front part of the battery case 2 and the air inlet port 13 formed in the first constraint plate 11. The cooling air introduced into the battery case 2 flows toward the second constraint plate 15 placed at the rear part of the battery case 2 through the passage between the upper and lower battery modules 3. The cooling air reaching to the rear part of the battery case 2 is exhausted to the outside through the exhaust port 17 formed on the second constraint plate 15 and the air exhaust duct 5.

In this case, at the upper edge and the lower edge of the air inlet port 13, a couple of shielding plates 14 are provided approximately in parallel while protruding into the battery case 2. Thus, the cooling air entering from the air inlet port 13 to the passage between the upper and lower battery modules is shielded by the shielding plates 14. Thus, the amount of heat absorbed from the first cell 7 is reduced. Therefore, since the temperature of the cooling air is not increased due to the heat from the first cell 7, the second and third cells 7 can be cooled efficiently by the cooling air. In particular, in this embodiment, since each battery module 3 is composed of three cells 7, as compared with the case where each battery module is composed of four cells 7 or more, it is possible to reduce the variation of temperature between the cells 7.

Furthermore, in the middle part between the upper and lower nut through holes 16 of the second constraint plate 15, a wedge-shaped rectifying fin 18 is provided while protruding into the battery case 2. Therefore, the flow rate of the cooling air entering from the air inlet port 13 is increased around the third cell 7 by the rectifying fin 18. Therefore, it is possible to improve the cooling efficiency of the third cell 7.

Therefore, since it is possible to reduce the difference of temperature between the cells 7 in the battery module 3, it is possible to suppress the variation of the battery performance such as charge/discharge capacity or life, etc. As a result, the reliability of the power supply unit can be enhanced.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A power supply unit comprising a battery case, a plurality of battery modules disposed in parallel, each battery module being composed of three cells or less connected in series in a row, and the front end and the rear end of the battery module being held by a front part and a rear part of the battery case, a cooling system for forcing a coolant to flow in a passage between the neighboring battery modules, and a shielding system for shielding the coolant from the battery module, which is placed at an upstream side of the passage.

2. The power supply unit according to claim 1, further comprising a means for increasing the flow rate of the coolant, placed at a downstream side of the passage.

3. The power supply unit according to claim 1, wherein a detachable first constraint plate is further provided at the front part of the battery case and the front end of the battery module is held by the first constraint plate.

4. The power supply unit according to claim 3, wherein an air inlet port for drawing the coolant into the battery case from the outside is provided on the first constraint plate, and the shielding means for shielding the coolant from the battery module are integrated into the first constraint plate with the air inlet port sandwiched between the shielding means.

5. The power supply unit according to claim 1, wherein the means for shielding the coolant from the battery module is provided approximately in parallel to the battery module while protruding into the battery case.

6. The power supply unit according to claim 1, wherein the following relationship is satisfied:

$$L/2 < m \leq L,$$

where L denotes a length of the cell, and m denotes a length of the shielding system for shielding the coolant from the battery module.

7. The power supply unit according to claim 1, wherein a second constraint plate is provided at the rear part of the battery case and the rear end of the battery module is held by the second constraint plate.

8. The power supply unit according to claim 7, wherein an exhaust port for exhausting the coolant to the outside from the inside of the battery case is provided in the second constraint plate, and a means for increasing the flow rate of the coolant is integrated into the second constraint plate.

9. The power supply unit according to claim 2, wherein the means for increasing the flow rate of the coolant is a wedge-shaped rectifying fin protruding into the battery case.

10. The power supply unit according to claim 4, wherein the means for shielding the coolant from the battery module is provided approximately in parallel to the battery module while protruding into the battery case.

11. The power supply unit according to claim 4, wherein the following relationship is satisfied:

$$L/2 < m \leq l,$$

where L denotes a length of the cell, and m denotes a length of the shielding system for shielding the coolant from the battery module.

12. The power supply unit according to claim 8, wherein the means for increasing the flow rate of the coolant is a wedge-shaped rectifying fin protruding into the battery case.

* * * * *